US012472590B2

(12) United States Patent
LoRicco et al.

(10) Patent No.: US 12,472,590 B2
(45) Date of Patent: Nov. 18, 2025

(54) SYSTEMS AND METHODS OF BLADE LEADING EDGE REPAIR USING FIELD ASSISTED SINTERING TECHNOLOGY

(71) Applicant: Raytheon Technologies Corporation, Farmington, CT (US)

(72) Inventors: Nicholas M LoRicco, Suffield, CT (US); Brian Richard Craig, Tequesta, FL (US); Brian T Hazel, Avon, CT (US); Luke Henry Rettberg, Santa Barbara, CA (US); Xuan Liu, Glastonbury, CT (US); Michael J Minor, Mansfield, TX (US); Christopher J Bischof, Southlake, TX (US); Stewart S Fowler, Ft Worth, TX (US); Steven Ivory, Storrs Mansfield, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/993,764

(22) Filed: Nov. 23, 2022

(65) Prior Publication Data

US 2024/0165751 A1    May 23, 2024

(51) Int. Cl.
*B23P 6/00* (2006.01)
*F01D 5/00* (2006.01)
*F01D 5/34* (2006.01)

(52) U.S. Cl.
CPC .............. *B23P 6/005* (2013.01); *F01D 5/005* (2013.01); *F01D 5/34* (2013.01); *F05D 2230/40* (2013.01);
(Continued)

(58) Field of Classification Search
CPC . B23P 6/005; F01D 5/005; F01D 5/34; F05D 2230/40; F05D 2230/80; F05D 2240/303; F05D 2230/236
See application file for complete search history.

(56) References Cited

U.S. PATENT DOCUMENTS

| 6,384,365 B1 | 5/2002 | Seth et al. |
| 6,438,838 B1 * | 8/2002 | Meier .................. F01D 5/3061 228/119 |

(Continued)

FOREIGN PATENT DOCUMENTS

| EP | 1332824 | 8/2003 |
| EP | 1505169 | 1/2013 |
| EP | 4105438 | 12/2022 |

OTHER PUBLICATIONS

Lin et al, "Sintering and Joining of NI-Based Superalloys Via Fast for Turbine Disc Applications", Metallurgical and Materials Transactions A, vol. 51, No. 3, dated Dec. 23, 2019, pp. 1353-1366, DOI: 10.1007/S11661-019-05600-7, [retrieved on Dec. 23, 2019].

(Continued)

*Primary Examiner* — Ryan J. Walters
(74) *Attorney, Agent, or Firm* — SNELL & WILMER L.L.P.

(57) ABSTRACT

A method can comprise forming a component comprising a first mating surface; coupling the component to an airfoil having a second mating surface and a Field Assisted Sintering Technology ("FAST") system; heating, via the FAST system, the airfoil and the component; and applying, via the FAST system, a mechanical pressure between the first mating surface and the second mating surface to join the airfoil to the component and form a blade, the component at least partially defining a leading edge of the blade in response to joining the airfoil to the component

12 Claims, 8 Drawing Sheets

(52) U.S. Cl.
CPC .... *F05D 2230/80* (2013.01); *F05D 2240/303* (2013.01)

(56) References Cited

U.S. PATENT DOCUMENTS

| | | | |
|---|---|---|---|
| 6,508,000 B2 | 1/2003 | Burke et al. | |
| 6,568,077 B1 * | 5/2003 | Hellemann | B23P 6/005 |
| | | | 228/19 |
| 7,399,159 B2 | 7/2008 | Matheny et al. | |
| 7,841,834 B1 * | 11/2010 | Ryznic | F04D 29/023 |
| | | | 416/224 |
| 10,265,908 B2 | 4/2019 | Piraccini et al. | |
| 11,634,989 B2 * | 4/2023 | Bales | B23K 20/02 |
| | | | 29/889.7 |
| 2013/0344347 A1 * | 12/2013 | Hugot | B22F 7/08 |
| | | | 419/8 |
| 2021/0254474 A1 * | 8/2021 | Farris | B22F 7/062 |
| 2023/0147399 A1 * | 5/2023 | Farris | F01D 9/041 |
| | | | 415/191 |

OTHER PUBLICATIONS

European Patent Office, European Search Report dated Apr. 29, 2024 in Application No. 23208051.5.

* cited by examiner

SYSTEMS AND METHODS OF BLADE LEADING EDGE REPAIR USING FIELD ASSISTED SINTERING TECHNOLOGY

FIELD

The present disclosure relates generally to blade repair systems and methods, and more particularly to, systems and methods for repairing a leading edge of an airfoil via field assisted sintering.

BACKGROUND

Gas turbine engines (such as those used in electrical power generation or used in modern aircraft) typically include a compressor, a combustor section, and a turbine. The compressor and the turbine typically include a series of alternating rotors and stators. A rotor generally comprises a rotor disk and a plurality of airfoils. The rotor may be an integrally bladed rotor ("IBR") or a mechanically bladed rotor.

The rotor disk and airfoils in the IBR are one piece (i.e., monolithic, or nearly monolithic) with the airfoils spaced around the circumference of the rotor disk. Conventional IBRs may be formed using a variety of technical methods including integral casting, machining from a solid billet, or by welding or bonding the airfoils to the rotor disk.

High pressure turbine blade leading edges experience distress during service. This distress manifest itself in the form of oxidation, erosion, and thermal mechanical fatigue (TMF), impact damage and mechanical rub with the shroud at the tip. Often these failure modes are combined and can accelerate distress. Eventually the distress becomes severe enough where the leading edge condition may drive an engine off wing for repair/overhaul. At overhaul, engine run turbine blades are repaired and restored whenever possible. Repaired turbine blades are much more economical than buying new replacement parts. However, today's turbine blade repair techniques do not have the ability to restore lost wall thickness in high-stress regions such as the leading edge. Thus, most blades are limited to between 1 and 3 repairs depending on their operational environment.

SUMMARY

A method is disclosed herein. In various embodiments, the method can comprise: forming a component comprising a first mating surface; coupling the component to an airfoil having a second mating surface and a Field Assisted Sintering Technology ("FAST") system; heating, via the FAST system, the airfoil and the component; and applying, via the FAST system, a mechanical pressure between the first mating surface and the second mating surface to join the airfoil to the component and form a blade, the component at least partially defining a leading edge of the blade in response to joining the airfoil to the component.

In various embodiments, the second mating surface extends from a first edge defined by the leading edge to a second edge defined by a tip of the airfoil.

In various embodiments, the method further comprises removing a portion of the airfoil to form the second mating surface of the airfoil, the second mating surface defining a plane, the plane forming an angle with a radial plane, the radial plane being normal to a centerline extending through the airfoil; wherein the removing the portion of the airfoil comprises machining off the portion of the airfoil. In various embodiments, the removing the portion of the airfoil includes machining the portion of the airfoil to remove a defect from the airfoil.

In various embodiments, the airfoil is made of a first metal alloy and the component is made of a second metal alloy, and wherein the first metal alloy is the second metal alloy.

In various embodiments, forming the component comprises casting the component from a metal alloy.

In various embodiments, the first mating surface and the second mating surface each comprise a flatness between 0.0001 inches and 0.01 inches.

In various embodiments, a surface roughness of the first mating surface and the second mating surface are each less than 64 microinches.

A blade is disclosed herein. In various embodiments, the blade comprises: an airfoil comprising an airfoil body extending radially outward from a platform to a tip; and a component coupled to the airfoil via a Field Assisted Sintering Technology ("FAST") process, the component and the airfoil body defining a seam at a mating interface between the component and the airfoil body, the component at least partially defining a leading edge of the blade.

In various embodiments, the seam extends from a first edge disposed at the leading edge of the airfoil to a second edge disposed at the tip of the airfoil.

In various embodiments, the seam extends radially outward and aft from the first edge.

In various embodiments, the first edge is between 25% span and 90% span of the airfoil.

In various embodiments, the second edge is forward of a forward rib in the airfoil.

In various embodiments, the mating interface defines a plane that forms an angle with a radial plane, the radial plane defined as being normal to a radial centerline of the airfoil.

A bladed rotor is disclosed herein. In various embodiments, the bladed rotor comprises: a blade comprising: an airfoil comprising an airfoil body extending radially outward from a platform to a tip; and a component coupled to the airfoil, the component and the airfoil body defining a mating interface between the component and the airfoil body, the mating interface defining a plane that forms an angle with a radial plane, the radial plane defined as being normal to a radial centerline of the airfoil.

In various embodiments, the mating interface extends from a first edge disposed at a leading edge of the airfoil to a second edge disposed at the tip of the airfoil.

In various embodiments, the mating interface extends radially outward and aft from the first edge.

In various embodiments, the first edge is between 25% span and 90% span of the airfoil. The second edge can be forward of a forward rib in the airfoil.

In various embodiments, the blade further comprises a plurality of blades coupled to a rotor disk, wherein the blade is a repaired blade, and wherein the blade is coupled to the rotor disk.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
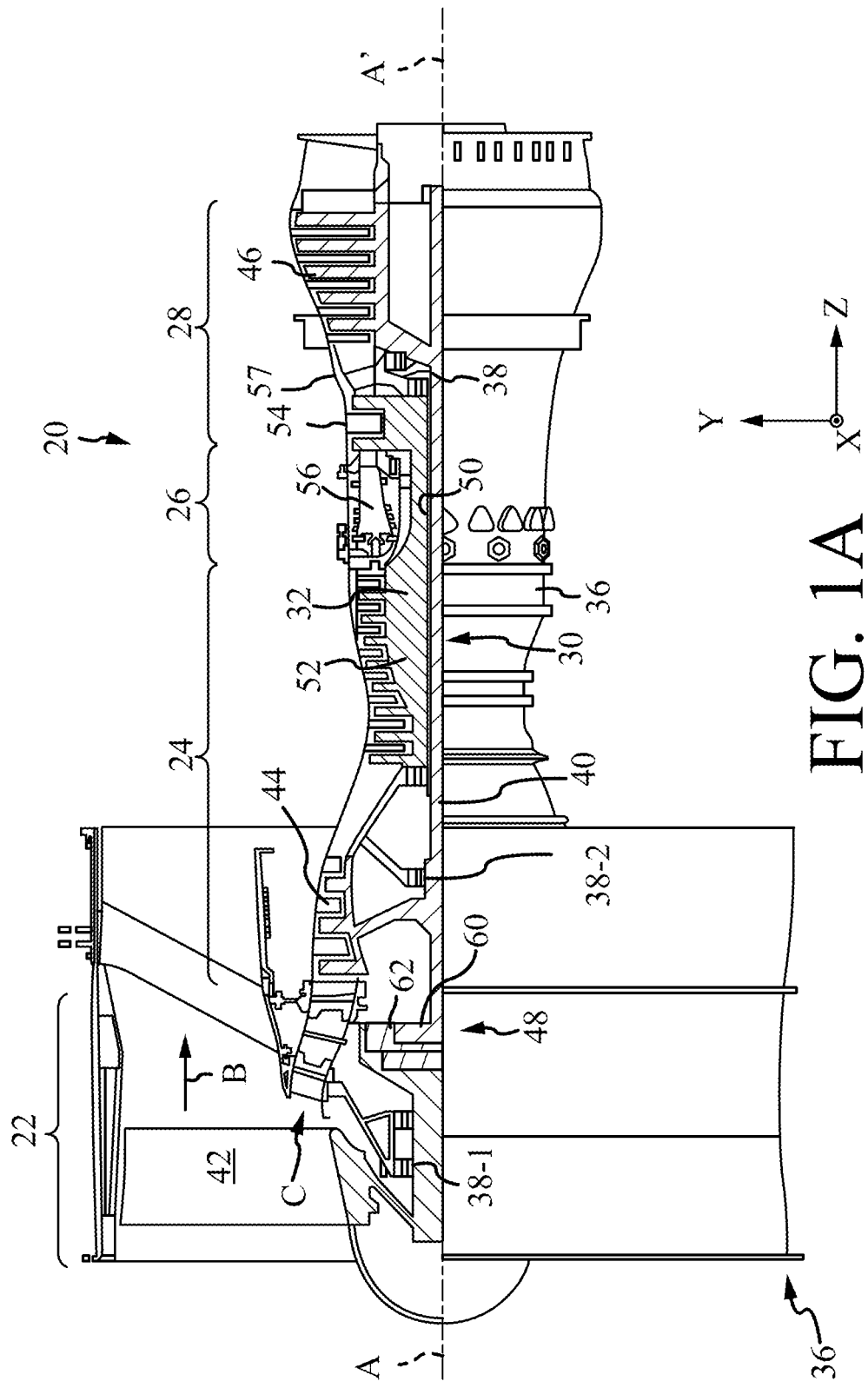
FIG. 1A illustrates a cross-sectional view of a gas-turbine engine, in accordance with various embodiments.

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Disclosed herein is a turbine blade leading edge repair system and method using the Field Assisted Sintering Technology ("FAST") process. FAST is a solid-state joining process which combines mechanical force, temperature, and electrical current to bond two mating surfaces via diffusion, such as a solid-state diffusion. The process can be used to join similar or dissimilar materials. In various embodiments, a FAST process as described herein can also be referred to as a direct current sintering (DCS) process, a spark plasma sintering ("SPS") process or the like.

Although described herein as being leading edge repair systems and methods, the present disclosure is not limited in this regard. For example, the methods and systems disclosed herein can be utilized in a manufacturing process to produce a hybrid blade concept that has a leading edge that is purposefully different from a remainder of the airfoil and still be within the scope of this disclosure.

The repair process disclosed herein can be utilized to replace a damaged leading edge material. When a leading edge of a turbine blade has incurred significant damage during service, such as a hole caused by burning or impact, the turbine blade is scrapped. In this regard, by utilizing the process disclosed herein, a cost of replacing the turbine blade can be greatly reduced to a cost of repair, in accordance with various embodiments. In various embodiments, the process can comprise removing a portion of the turbine blade including the damaged portion of the leading edge. In various embodiments, removing the portion of the turbine blade can comprise machining off the damage (e.g., via a machining process, such as grinding, milling, lathing, etc.).

With reference to FIG. 1A, a gas turbine engine 20 is shown according to various embodiments. Gas turbine engine 20 may be a two-spool turbofan that generally incorporates a fan section 22, a compressor section 24, a combustor section 26, and a turbine section 28. In operation, fan section 22 can drive air along a path of bypass airflow B while compressor section 24 can drive air along a core flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures, single spool architecture or the like.

Gas turbine engine 20 may generally comprise a low-speed spool 30 and a high-speed spool 32 mounted for rotation about an engine central longitudinal axis A-A' relative to an engine static structure 36 or engine case via several bearing systems 38, 38-1, etc. Engine central longitudinal axis A-A' is oriented in the Z direction on the provided X-Y-Z axes. It should be understood that various bearing systems 38 at various locations may alternatively or additionally be provided, including for example, bearing system 38, bearing system 38-1, etc.

Low-speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low-speed spool 30. Geared architecture 48 may comprise a gear assembly 60 enclosed within a gear housing 62. Gear assembly 60 couples inner shaft 40 to a rotating fan structure. High-speed spool 32 may comprise an outer shaft 50 that interconnects a high-pressure compressor 52 and high-pressure turbine 54. A combustor 56 may be located between high-pressure compressor 52 and high-pressure turbine 54. A mid-turbine frame 57 of engine static structure 36 may be located generally between high-pressure turbine 54 and low-pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low-pressure compressor 44 then high-pressure compressor 52, mixed and burned with fuel in combustor 56, then expanded over high-pressure turbine 54 and low-pressure turbine 46. Turbines 46, 54 rotationally drive the respective low-speed spool 30 and high-speed spool 32 in response to the expansion.

Figure 1B:
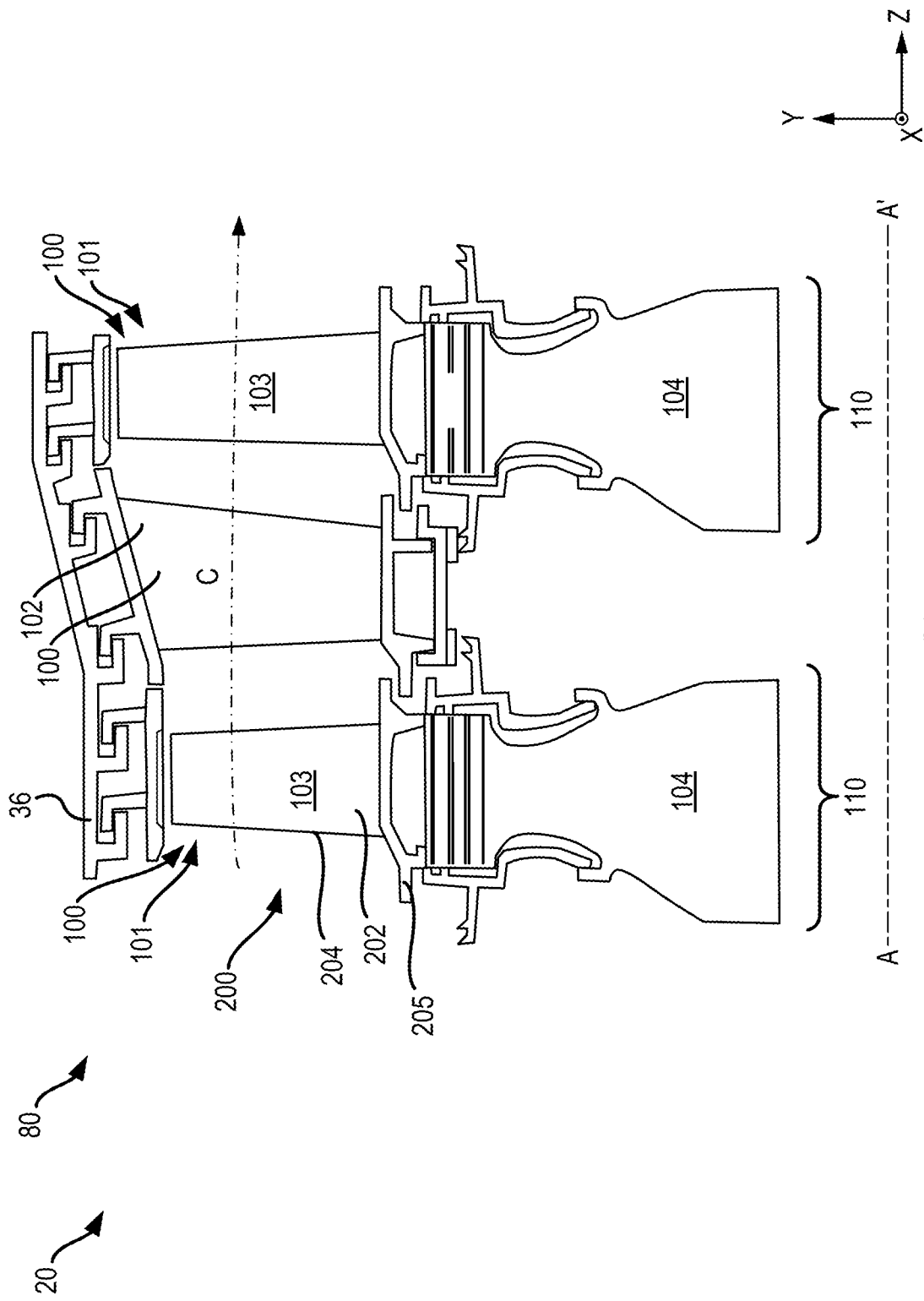
FIG. 1B illustrates a cross-sectional view of a high pressure compressor, in accordance with various embodiments.

Referring now to FIG. 1B and still to FIG. 1A, according to various embodiments, each of low-pressure compressor 44, high-pressure compressor 52, low-pressure turbine 46, and high-pressure turbine 54 in gas turbine engine 20 may comprise one or more stages or sets of rotating blades 101 and one or more stages or sets of stationary vanes 102 axially interspersed with the associated blade stages but non-rotating about engine central longitudinal axis A-A'. The compressor and turbine sections 24, 28 may include rotor assemblies 110. Each compressor stage and turbine stage may comprise multiple interspersed stages of blades 101 and vanes 102. Within the rotor assemblies 110 of gas turbine engine 20 are multiple rotor disks, which may include one or more cover plates or minidisks. The blades 101 rotate about engine central longitudinal axis A-A', while the vanes 102 remain stationary with respect to engine central longitudinal axis A-A'. For example, FIG. 1B schematically shows, by example, a portion of an engine section 80, which is illustrated as a turbine section 28 of gas turbine engine 20. It will be understood that the repair and/or manufacturing systems and methods in the present disclosure are not limited to the turbine section 28 and could extend to other sections of the gas turbine engine 20, including but not limited to compressor section 24.

Engine section 80 may include alternating rows of blades 101 and vanes 102 comprising airfoils 103 that extend into the core flow path C. The blades 101 may each include a bladed rotor 100. In various embodiments, the bladed rotor 100 can comprise a mechanically bladed rotor (i.e., each airfoil 103 mechanically coupled to the rotor disk 104). However, the present disclosure is not limited in this regard. For example, the bladed rotor 100 is an integrally bladed rotor, such that the airfoils 103 (e.g., blades) and rotor disks 104 are formed from a single integral component (i.e., a monolithic component formed of a single piece), in accordance with various embodiments.

During operation of the gas turbine engine 20, foreign object debris ("FOD") can travel along the flow path C and contact blades an airfoil 103 of a respective blade in the blades 101. For example, a blade 200 can comprise an airfoil 202 extending radially outward from a platform 205, the airfoil defining a leading edge 204. As the leading edge 204 is disposed at a forward end of the flow path C, the leading edge 204 can be more susceptible to damage from FOD during operation of the gas turbine engine 20, in accordance with various embodiments.

Typical repair processes for turbine blades are insufficient to restore a lost wall thickness, a through-hole, or any other type of damage at a leading edge 204 of an airfoil 202. For example, tips of an airfoil are commonly repaired via welding, which is not an acceptable technique on the leading edge 204 where mechanical loads are higher and a resulting heat effected zone and cracking are not permissible. The process disclosed further herein for repairing damage to the leading edge 204 of the airfoil 202 enables restoration of a wall thickness on the leading edge 204 for a blade 200 that would otherwise be scrapped.

Figure 2:
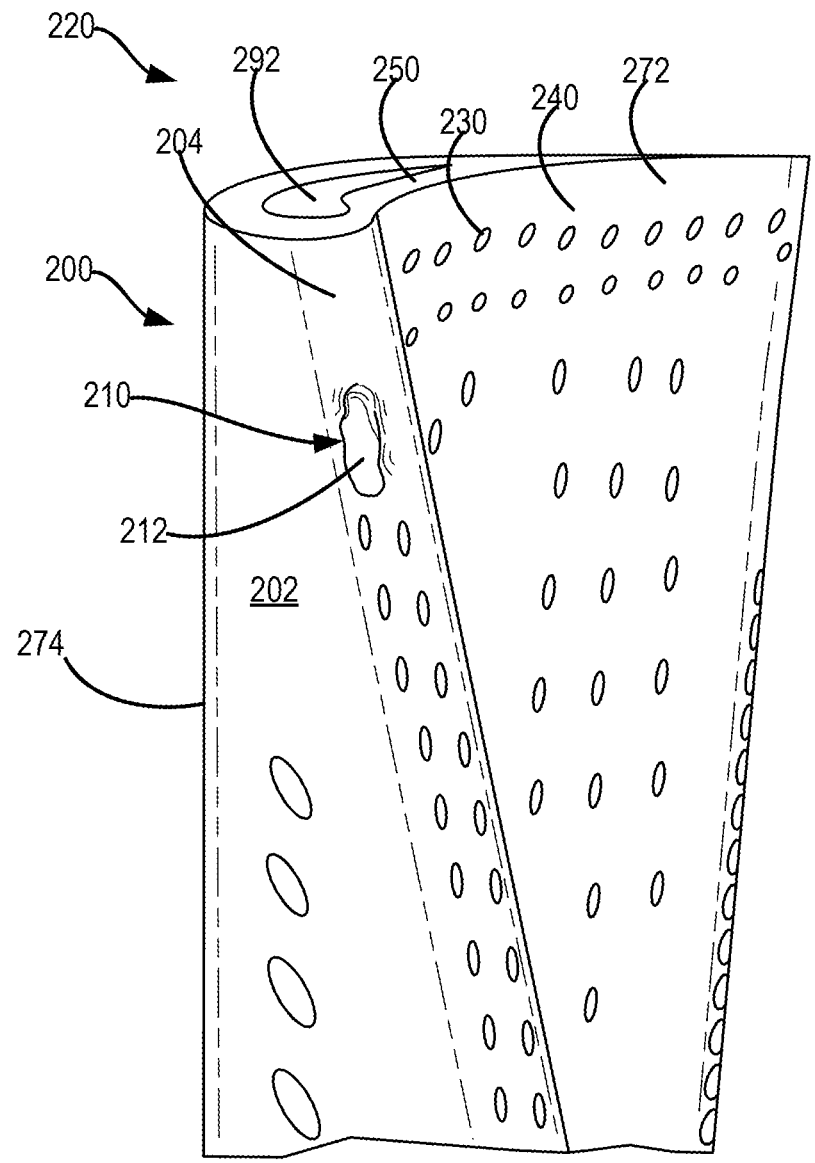
FIG. 2 illustrates a perspective view of a damaged airfoil of a blade, in accordance with various embodiments.

Referring now to FIG. 2, a perspective view of a blade 200 with damage 210 disposed on a leading edge 204 of an airfoil 202 of the blade 200 is illustrated in accordance with various embodiments. In various embodiments, the airfoil 202 comprises a tip pocket 292 of a cooling channel 220 and a plurality of apertures 230 disposed through an airfoil body 240 of the airfoil 202 and in fluid communication with the cooling channel 220. In various embodiments, the damage 210 is disposed on the leading edge 204 proximate a tip 250 of the airfoil 202. In various embodiments, the damage 210 comprises a through-hole 212 that extends through the leading edge 204 to the cooling channel 220. In various embodiments, the through-hole 212 can be significantly larger than the apertures 230 disposed in the airfoil body 240. In this regard, the through-hole 212 can negatively affect a cooling flow through the cooling channel 220. As such, blade 200 that included damage 210 at a leading edge 204 of an airfoil 202 as shown in FIG. 2, are often scrapped. In various embodiments, the through-hole 212 has an inlet area that is at least three times an inlet area of the apertures 230 disposed at the leading edge 204, or at least five times an inlet area of the apertures 230 disposed at the leading edge. However, the present disclosure is not limited in this regard.

Although the damage 210 is illustrated as a through-hole 212, the present disclosure is not limited in this regard. For example, the damage 210 can comprise a dent (e.g., a recess or the like) that causes a thin wall at the leading edge 204 and could cause operational or structural concerns if returned to service, in accordance with various embodiments. Although the airfoil body 240 is illustrated as having various apertures 230 at the leading edge 204, on a pressure side 272, and on a suction side 274, the present disclosure is not limited in this regard. For example, an airfoil body 240 without the apertures 230 is within the scope of this disclosure.

In various embodiments, the damage 210 is disposed proximate the tip 250 of the airfoil body 240. In this regard, based on a configuration of the cooling channel 220, the airfoil body can include a wall at the leading edge 204 proximate the tip 250 that is thinner than a wall at the leading edge 204 that is radially closer to the platform 205 from FIG. 1B. As such, the leading edge 204 can be more susceptible to the damage 210 proximate the tip 250 compared to being proximate the platform. In various embodiments, the damage 210 is disposed between a 50% span and a 100% span of the airfoil 202, or between 70% span and 100% span of the airfoil, or between 80% span and 100% span of the airfoil. "Span" of the airfoil is defined herein as a percentage of distance from the platform 205 from FIG. 1B to the tip 250 of the airfoil 202 (i.e., $$\% \text{ span} = 1 - \frac{b - b_{damage}}{b}$$

where b is a span of the airfoil 202 and $b_{damage}$ is a radial distance from the platform 205 to the damage).

In various embodiments, the airfoil body 240 can comprise an alloy (e.g., a superalloy, such as a cobalt or a nickel-based alloy). In various embodiments, the alloy can comprise a single crystal alloy. In various embodiments, a single crystal alloy can be more robust relative to polycrystal alloys. In various embodiments, the alloy can comprise between 56% and 62% nickel, between 4% and 12% chromium, between 1.5% and 6% molybdenum, between 5 and 15% cobalt, between 3 and 7% tungsten, between 4 and 12% tantalum, and between 3% and 7% aluminum (e.g., an alloy in accordance with PWA 1426, PWA 1429, PWA 1432, PWA 1437, PWA 1440, PWA 1449, PWA 1455, PWA 1475, PWA 1480, PWA 1483, PWA 1484, PWA 1487, PWA 663, PWA 1497, PWA 1499, or the like).

Figure 3:
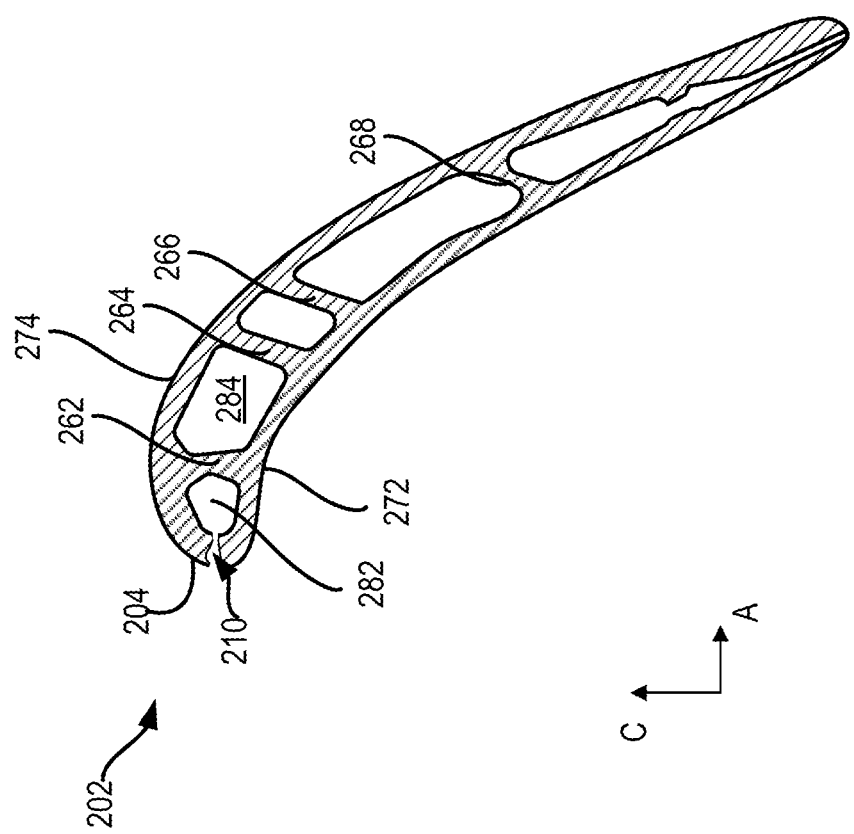
FIG. 3 illustrates a radial cross-sectional view of the damaged airfoil from FIG. 2, in accordance with various embodiments.

Referring now to FIG. 3, a cross-sectional view of the airfoil 202 along a radial plane is illustrated, in accordance with various embodiments. A "radial plane" as referred to herein is a plane that is normal to a centerline of the airfoil 202 that intersects, and is perpendicular to, an engine central longitudinal axis A-A' from FIG. 1B. In this regard, the cross-sectional view of the airfoil 202 can be further defined within a coordinate system defined by an axial direction (A) and a circumferential direction (C), wherein the circumferential direction is tangent to the radial direction that defines the cross-sectional plane and is in a direction of rotation for the bladed rotor 100 from FIG. 1B during operation.

In various embodiments, the airfoil 202 further comprises a plurality of ribs (e.g., rib 262, rib 264, rib 266, and/or 268). Each rib (e.g., rib 262, rib 264, rib 266, rib 268) in the plurality of ribs extends from a pressure side 272 of the airfoil 202 to a suction side 274 of the airfoil. The ribs can at least partially define cooling channels therebetween. For example, the rib 262, a portion of the pressure side 272, a portion of the suction side 274, and the rib 264 define a cooling channel 284 therein. In various embodiments, the airfoil 202 comprises a leading edge cooling channel 282 at least partially defined by a forward most rib (e.g., rib 262), a portion of the pressure side 272, a portion of the suction side 274, and the leading edge. In various embodiments, the rib 262 can extend radially to the tip 250 from FIG. 2 (or proximate the tip 250 from FIG. 2). In various embodiments, the rib 262 that is disposed adjacent to the leading edge 204 can be utilized to determine a removal angle for a machining operation, in accordance with various embodiments, as described further herein.

Figure 4:
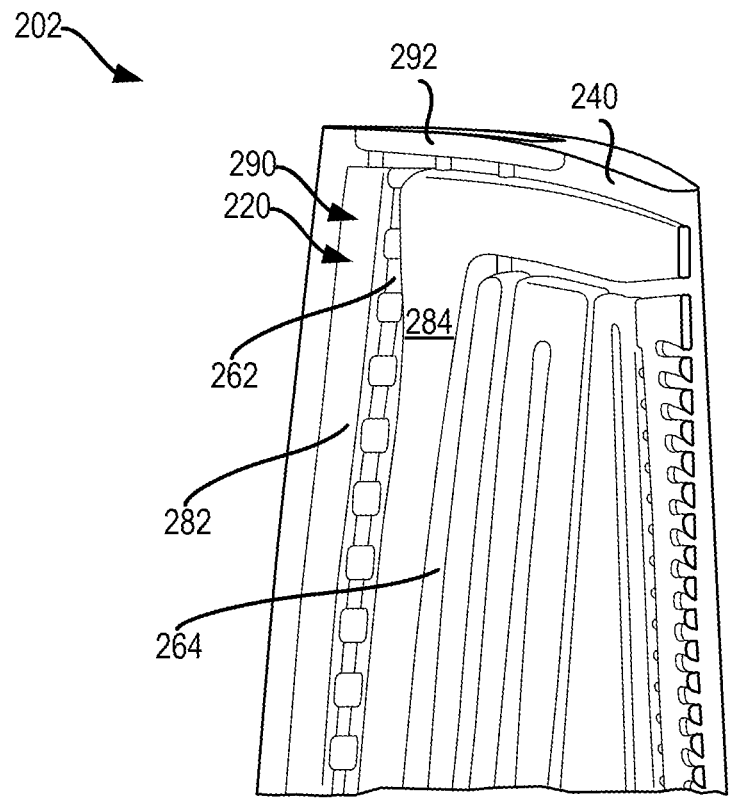
FIG. 4 illustrates a side view of a blade with the airfoil body being translucent to illustrate a core of the blade, in accordance with various embodiments.
Figure 5:
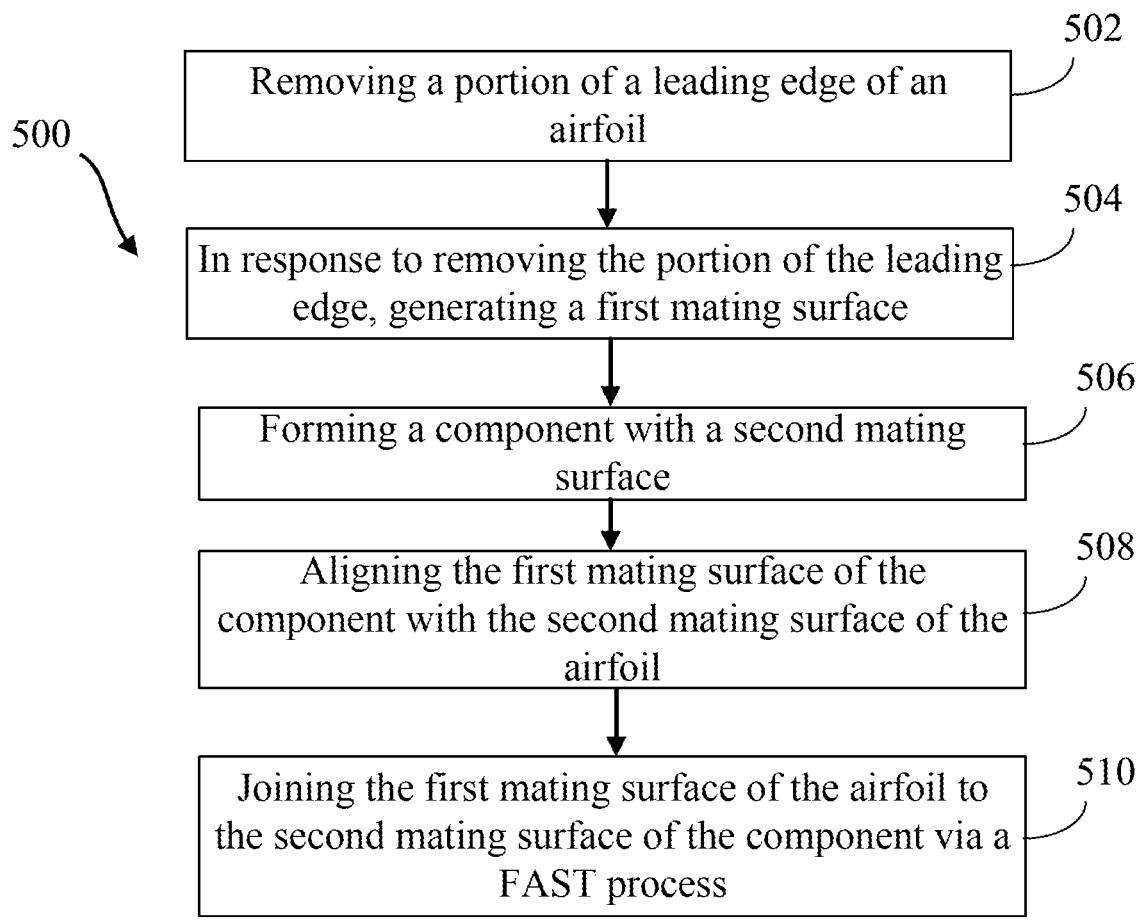
FIG. 5 illustrates a repair process for repairing a leading edge of an airfoil, in accordance with various embodiments.

Referring now to FIG. 4, side view of a core of the airfoil 202 is illustrated, in accordance with various embodiments, with like numerals depicting like elements, in accordance with various embodiments. Stated another way, the airfoil body 240 is illustrated as being translucent and the core 290 is illustrated as being solid to illustrate a configuration of the cooling channel 220 through the airfoil body 240, in accordance with various embodiments. In various embodiments, a tip pocket 292 defines an outlet of the cooling channel 220 of the core 290, in accordance with various embodiments. In this regard, the tip pocket 292 can be in fluid communication with the leading edge cooling channel 282 and the cooling channel 284 as shown.

Figure 6:
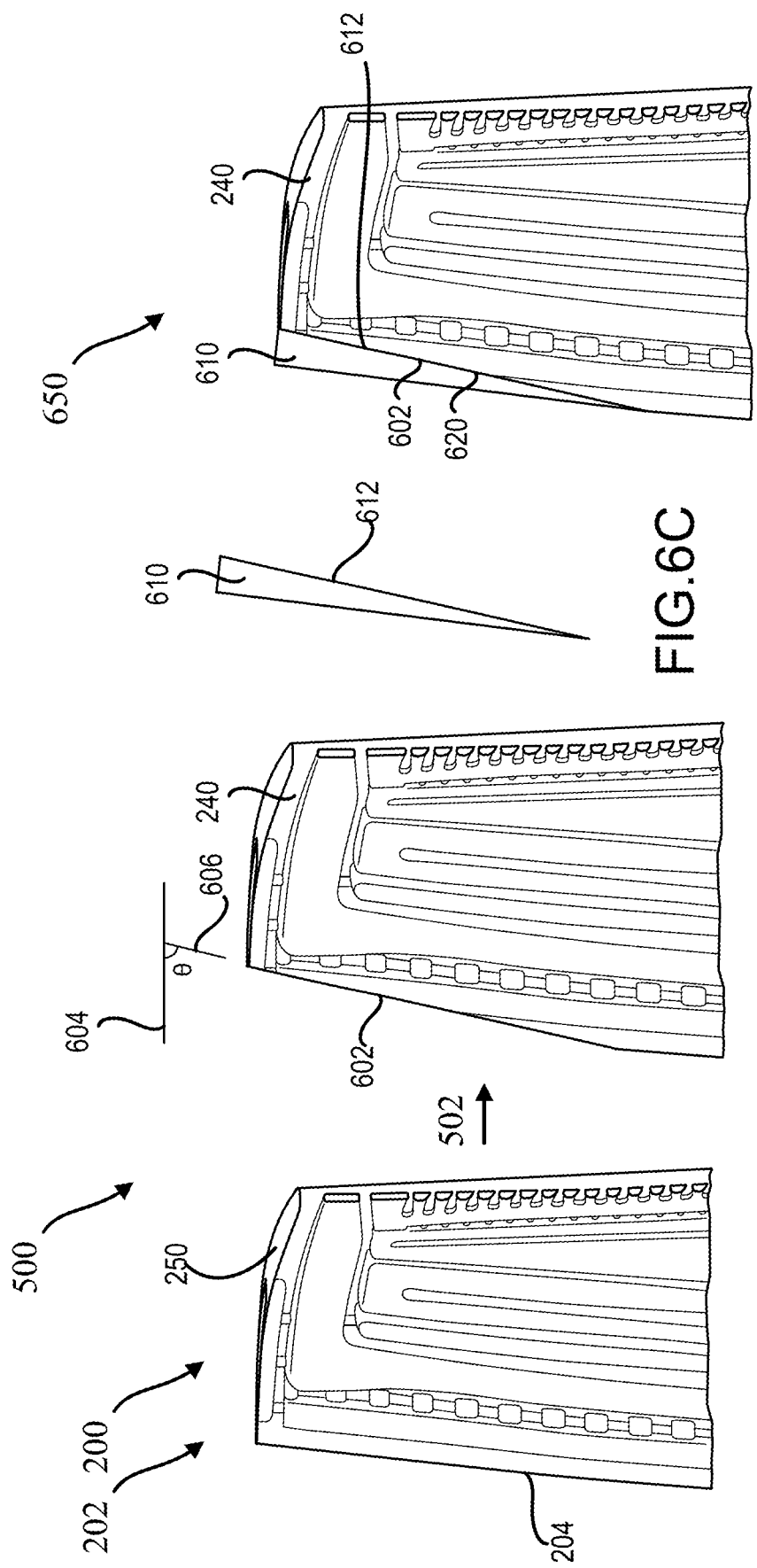
FIG. 6A illustrates a blade during the repair process of FIG. 5, in accordance with various embodiments.
FIG. 6B illustrates a blade during the repair process of FIG. 5, in accordance with various embodiments.
FIG. 6C illustrates a blade during the repair process of FIG. 5, in accordance with various embodiments.
FIG. 6D illustrates a repaired blade after the repair process of FIG. 5.

Referring now to FIGS. 5 and FIGS. 6A-D, a flow chart for a repair process 500 (FIG. 5), and illustrations of the repair process 500 (FIGS. 6A-D) for repairing a leading edge 204 of an airfoil 202 of a blade 200 for a bladed rotor is illustrated, in accordance with various embodiments. In various embodiments, the process 500 comprises removing a portion of a leading edge 204 of an airfoil 202 (step 502) as shown in FIG. 6B. In various embodiments, removing the portion of the leading edge 204 of the airfoil 202 can comprise machining the portion of the airfoil 202 off the airfoil 202. In various embodiments, removing the portion of the leading edge 204 of the airfoil 202 can comprises blending the portion of the airfoil. In various embodiments, a portion of the tip 250 of the airfoil 202 is also removed during step 502. For example, step 502 can further comprise determining a removal angle θ for a removal plane 606 for removing the portion of the leading edge 204. In various embodiments, the removal angle θ is relative to a radial plane (e.g., radial plane 604) as defined by the blade 200 and disclosed previously herein. In this regard, the removal angle θ is defined by the radial plane 604 and the removal plane 606.

Figure 7:
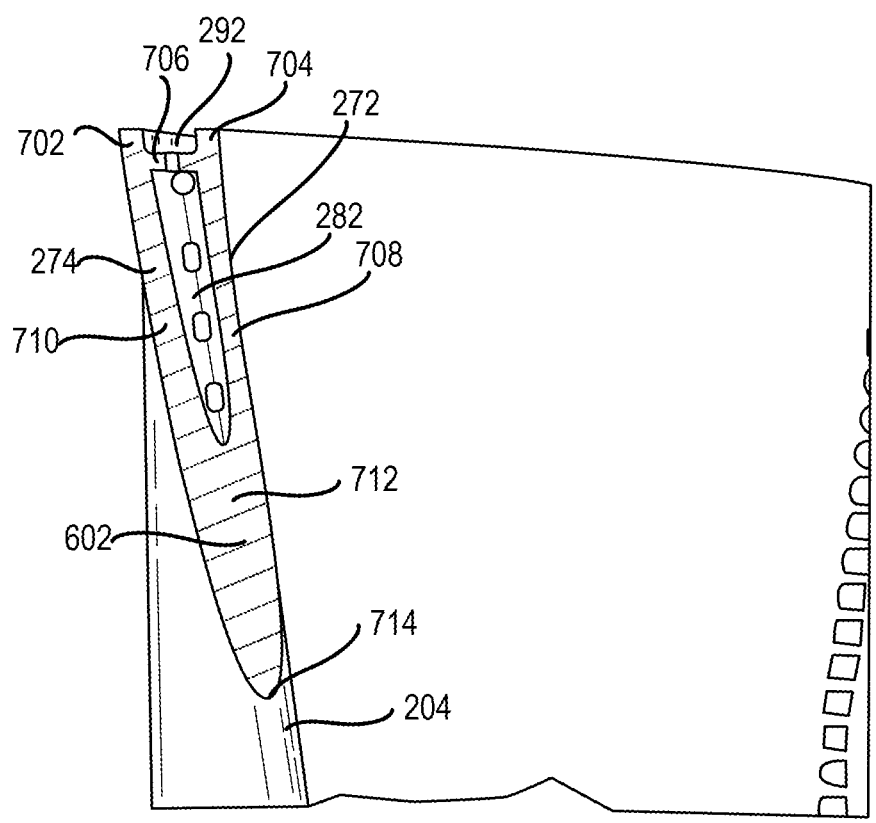
FIG. 7 illustrates a blade during the repair process of FIG. 5, in accordance with various embodiments

In various embodiments, in response to step 502, a first mating surface 602 of an airfoil body 240 is created (step 504) as shown in FIG. 6B. With brief reference to FIG. 7, the first mating surface 602 can be relatively flat and relatively smooth. For example, a surface roughness of the first mating surface 602 can be less than or equal to 64 microinches, or less than or equal to 32 microinches. However, the present disclosure is not limited in this regard and any surface roughness is within the scope of this disclosure. In various embodiments, by having a relatively flat mating surface and a relatively smooth mating surface, a more robust joint can be generated from the solid-state joining process (i.e., the FAST process), as described further herein. In various embodiments, the first mating surface 602 can include various surfaces defined by the removal in step 502. For example, an inner edge of surfaces 702, 704, 706 of the first mating surface 602 can partially define the tip pocket 292. An outer edge of surface 708 can at least partially define pressure side 272 and an outer edge of surface 710 can define the suction side 274. Surface 712 can be a portion of the first mating surface 602 that is removed from the leading edge 204 prior to the leading edge cooling channel 282. In various embodiments, the first mating surface 602 is a planar surface defined by the removal plane 606 from FIG. 6B. In various embodiments, the first mating surface 602 is further defined by a radially inner most edge 714. In this regard, the radially inner most edge defines a transition between a remaining portion of the leading edge 204 and the first mating surface 602. In various embodiments, the radially inner most edge is between 25% and 90% span, or between 40% and 80% span of the airfoil 202.

In various embodiments, with brief reference to FIG. 3, a radially outer edge of the first mating surface 602 generated from steps 502 and 504 of process 500 can be axially forward of the forward most rib (e.g., rib 262). In this regard, the repair process 500 of FIG. 5 will not impact structural capabilities of a repaired airfoil that is created from the repair process 500, in accordance with various embodiments.

Referring back to FIGS. 5 and 6A-D, the process 500 further comprises forming a component 610 with a second mating surface 612 (step 506). In various embodiments, the component 610 corresponds to a portion of the leading edge 204 as the leading edge 204 was originally designed (i.e., a leading edge 204 within tolerances of a newly manufactured airfoil 202), in accordance with various embodiments. In various embodiments, the component 610 defines the second mating surface 612 (e.g., a mating surface can substantially mirror the first mating surface 602 from FIGS. 6A and 7). "Substantially mirror" as described herein refers to being within a 0.1 inch profile (0.25 cm profile) of the other mating surface, or being within a 0.05 inch profile (0.127 cm) of the other mating surface.

In various embodiments, step 506 further comprises casting the component 610. However, the present disclosure is not limited in this regard. For example, the component 610 can be additively manufactured, plunge electrical discharge machined (EDM'd), machined, or the like and still be within the scope of this disclosure. In this regard, based on a shape of the component 610, a manufacturing process for forming the component 610 can be determined, in accordance with various embodiments. In various embodiments, if the component 610 is based on an originally manufactured design, a mismatch can potentially occur between the component 610 and the airfoil 202, which may be worn. As such, the component 610 can be machined after the component 610 is formed in step 506 in order to correct a mismatch between the component 610 and the airfoil 202 being repaired, in accordance with various embodiments.

In various embodiments, the component 610 can comprise an alloy (e.g., a superalloy, such as a cobalt or a nickel-based alloy). In various embodiments, the alloy can be in accordance with the alloy of the airfoil 202. For example, in various embodiments, the alloy can comprise between 56% and 62% nickel, between 4% and 12% chromium, between 1.5% and 6% molybdenum, between 5 and 15% cobalt, between 3 and 7% tungsten, between 4 and 12% tantalum, and between 3% and 7% aluminum (e.g., an alloy in accordance with PWA 1426, PWA 1429, PWA 1432, PWA 1437, PWA 1440, PWA 1449, PWA 1455, PWA 1475, PWA 1480, PWA 1483, PWA 1484, PWA 1487, PWA 663, PWA 1497, PWA 1499, or the like). However, the present disclosure is not limited in this regard. In various embodiments, the component 610 can comprise a second alloy that is different from the first alloy. For example, the component 610 can be made of an alloy that is between 54% and 72% nickel, between 4% and 20% chromium, between 0.0% and 10% molybdenum, between 7% and 19% cobalt, between 0% and 6% niobium, between 0% and 10% tungsten, between 0% and 10% titanium, between 0% and 8% tantalum, between 0% and 6% rhenium, between 0% and 7% aluminum, and between 0% and 2% hafnium (e.g., Rene 100, Rene 104, Rene 108, Rene 120, Rene 125, Rene 142, Rene 220, Rene 41, Rene 77, Rene 80, Rene 88, Rene 95, Rene N4, Rene N5, Rene N500, Rene 195, or the like). In various embodiments, the first alloy comprises PWA 1429 and the second alloy comprises Rene 195.

In various embodiments, the process 500 further comprises aligning the first mating surface 602 of the airfoil body 240 with the second mating surface 612 of the component 610 (step 508) and joining the airfoil body 240 to the blade tip body via a FAST process (step 510). As referred to herein, the "FAST process" is a low voltage, direct current (DC) pulsed current activated, pressure-assisted sintering, and synthesis technique. Although described as pulsed current activated, the present disclosure is not limited in this regard. For example, a FAST process with continuous direct current is within the scope of this disclosure. The FAST process can be used to synthesize adjacent components (e.g., the airfoil body 240 and the component 610) and/or to densify materials in one step. Since the airfoil body 240 and component 610 are electrically conductive, energy can be dissipated directly within the airfoil body 240 and the component 610 and the electrically conductive parts of the pressing tool.

The FAST process comprises a mechanical loading system, which acts at the same time as high-power electrical circuit, placed in a controlled atmosphere. The electrical conductivity of the materials used for tooling facilitate low voltages (typically below 10 V applied to the whole set-up) and produce high currents (typically from 1 to 10 kA) leading to efficient heating. Even in the case of electrically non-conductive sintering powder, heat is quickly and efficiently transferred to the airfoil body 240 and/or the component 610 described previously herein. Depending on the used hardware it is possible to define pulse and pause durations or more specialized pulse patterns. Typical pulse duration is in the order of a few milliseconds. Owing to the compact geometry of the die and punches, sintering cycles with heating rates as high as 1000° C. per minute are thus possible and enable to significantly reduce the total duration of the process and energy costs. Standard cooling rates of up to 150° C. per minute are possible. Additional active cooling under gas flow can enable quenching rates of 400° C. min. At the same time, the simultaneous application of a uniaxial mechanical pressure enhances densification (maximal loads typically between 50 and 250 kN). The process 500 can take place under vacuum or protective gas at atmospheric pressure: all heated parts are kept in a water-cooled chamber. Control of the processing cycle is usually done by temperature measurement (using either thermocouples or axial/radial pyrometers, etc.) but can also be achieved by other methods like power, current, or simply by displacement control. Maximal temperature achieved by using standard graphite tools lies up to 2400° C.

In various embodiments, in response to joining the component 610 to the airfoil 202, a repaired blade 650 is formed as shown in FIG. 6D. The repaired blade 650 comprises the airfoil body 240 and the component 610. In various embodiments, in response to the joining of the component 610 and the airfoil 202, a seam 620 is defined between the component 610 and the airfoil body 240. In various embodiments, the seam is a continuous seam between the mating surfaces 602, 612. In various embodiments, the seam 620 is a transition portion between the component 610 and the airfoil body 240. In this regard, material properties in the transition portion can be slightly different than material properties of the component 610 and the airfoil body 240 due to the joining process described herein, in accordance with various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method, comprising:
    removing a portion of an airfoil to form a second mating surface of the airfoil, the second mating surface defining a plane, the plane forming an acute angle with a radial plane, the radial plane being normal to a centerline extending through the airfoil, wherein the removing the portion of the airfoil comprises machining off the portion of the airfoil, the second mating surface extending from a first point of a first edge defined by a leading edge of the airfoil at a first radial position to a second point of a second edge defined by a tip of the airfoil at a second radial position, the second radial position disposed radially outward from the first radial position;
    forming a component comprising a first mating surface extending from and bounded by a third point of a component first edge defined by a component leading edge and a fourth point of a component second edge defined by a component tip, wherein the third point corresponds to the first point and the fourth point corresponds to the second point, and wherein the component leading edge and the component tip define an outer contour of the component, the outer contour within a design tolerance of the airfoil;
    coupling the component to the airfoil having the second mating surface and a Field Assisted Sintering Technology ("FAST") system, wherein the coupling includes:
        mating the first mating surface to the second mating surface such that the first point mates to the third point and the second point mates to the fourth point;
        heating, via the FAST system, the airfoil and the component; and
        applying, via the FAST system, a mechanical pressure between the first mating surface and the second mating surface to join the airfoil to the component and form a blade, the component at least partially defining a blade leading edge of the blade in response to joining the airfoil to the component.

2. The method of claim 1, wherein removing the portion of the airfoil includes machining the portion of the airfoil to remove a defect from the airfoil.

3. The method of claim 1, wherein the airfoil is made of a first metal alloy and the component is made of a second metal alloy, and wherein the first metal alloy is the second metal alloy.

4. The method of claim 1, wherein forming the component comprises casting the component from a metal alloy.

5. The method of claim 1, wherein the first mating surface and the second mating surface each comprise a flatness between 0.0001 inches and 0.01 inches.

6. The method of claim 1, wherein a surface roughness of the first mating surface and the second mating surface are each less than 64 microinches.

7. The method of claim 1, wherein a blade leading edge is defined by a remaining portion of the leading edge of the airfoil, and a component leading edge of the component.

8. The method of claim 1, wherein the second mating surface at least partially defines a tip pocket of a cooling channel.

9. The method of claim 1, wherein the second mating surface at least partially defines a pressure side of the airfoil and a suction side of the airfoil.

10. The method of claim 1, wherein the component leading edge and the component tip correspond to the leading edge and the tip of the airfoil such that the outer contour of the component completes an outer contour of the airfoil with the portion removed.

11. The method of claim 10, wherein a profile of the first mating surface substantially mirrors a corresponding profile of the second mating surface.

12. The method of claim 11, wherein the profile of the first mating surface is within a 0.05 inch tolerance of the corresponding profile of the second mating surface.

* * * * *